US008810556B2

(12) United States Patent
Lee et al.

(10) Patent No.: US 8,810,556 B2
(45) Date of Patent: Aug. 19, 2014

(54) ACTIVE MATRIX ORGANIC LIGHT EMITTING DIODE (OLED) DISPLAY, PIXEL CIRCUIT AND DATA CURRENT WRITING METHOD THEREOF

(75) Inventors: Chia-Yu Lee, Hsin-Chu (TW); Lee-Hsun Chang, Hsin-Chu (TW); Tze-Chien Tsai, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 225 days.

(21) Appl. No.: 12/684,902

(22) Filed: Jan. 9, 2010

(65) Prior Publication Data

US 2011/0169798 A1 Jul. 14, 2011

(30) Foreign Application Priority Data

Sep. 8, 2009 (TW) .............................. 98130295 A

(51) Int. Cl.
*G06F 3/038* (2013.01)

(52) U.S. Cl.
USPC ................ 345/211; 345/55; 345/82; 345/204

(58) Field of Classification Search
USPC .............................. 345/204, 211–214, 76–86
See application file for complete search history.

(56) References Cited

U.S. PATENT DOCUMENTS

| | | | | |
|---|---|---|---|---|
| 6,594,606 | B2 | 7/2003 | Everitt | |
| 7,348,946 | B2 | 3/2008 | Booth, Jr. et al. | |
| 2002/0101172 | A1 * | 8/2002 | Bu | 315/169.3 |
| 2007/0139311 | A1 * | 6/2007 | Cho et al. | 345/76 |
| 2008/0122760 | A1 | 5/2008 | Levey et al. | |
| 2008/0136338 | A1 | 6/2008 | Troccoli et al. | |
| 2009/0231308 | A1 * | 9/2009 | Numao | 345/204 |
| 2010/0079419 | A1 * | 4/2010 | Shibusawa | 345/204 |

FOREIGN PATENT DOCUMENTS

| | | |
|---|---|---|
| CN | 1363916 A | 8/2002 |
| TW | 200723230 | 6/2007 |

OTHER PUBLICATIONS

Taiwan Patent Office, Office Action issued on Jul. 24, 2013, Taiwan.

* cited by examiner

*Primary Examiner* — Christopher E Leiby
(74) *Attorney, Agent, or Firm* — WPAT, PC; Justin King

(57) ABSTRACT

An exemplary active matrix organic light emitting diode (OLED) display includes a data line, a current sensing line, a power line and a plurality of pixels all electrically coupled to the data line, the current sensing line and the power line. During a data current is writing to a selected one of the pixels, the selected pixel draws a current from the current sensing line, and the data line supplies a particular data voltage to the selected pixel according to the drawn current from the current sensing line until the drawn current matched with the data current; the other non-selected pixels draw currents from the power line for light-emission. Moreover, a pixel circuit and a data current writing method adapted for the above-mentioned active matrix OLED display also are provided.

9 Claims, 3 Drawing Sheets

ACTIVE MATRIX ORGANIC LIGHT EMITTING DIODE (OLED) DISPLAY, PIXEL CIRCUIT AND DATA CURRENT WRITING METHOD THEREOF

CROSS-REFERENCE TO RELATED APPLICATIONS

This application is based upon and claims the benefit of priority from the prior Taiwanese Patent Application No. 098130295, filed Sep. 8, 2009, the entire contents of which are incorporated herein by reference.

BACKGROUND

1. Technical Field

The present invention generally relates to organic light emitting diode display technology fields and, particularly to an active matrix organic light emitting diode display, a pixel circuit and a data current writing method of the active matrix organic light emitting diode display.

2. Description of the Related Art

In regard to an organic light emitting diode (OLED) display, an issue encountered in a low temperature poly-silicon (LTPS) process for manufacturing the OLED display is that threshold voltages of manufactured transistors are not identical with one another, which would result in the existence of difference among currents flowing through respective transistors for driving OLEDs and thereby cause uneven brightness of display. In another aspect, an issue produced in an amorphous silicon thin film process for manufacturing the OLED display is that the threshold voltages of respective transistors for driving the OLEDs would be varied under long time use. In addition, the OLEDs have inherent issue of aging and thus light-emission efficiency would decrease along the increase of using time.

In order to improve the influence associated with brightness caused by the above-mentioned factors, U.S. Pub. No. 2008/0136338 discloses an improved active matrix OLED display, the disclosure of which is fully incorporated herein by reference. Referring to FIG. 1, the active matrix OLED display includes a control circuit 21, a data line 22, a power line 24 and a plurality of pixels 23. Moreover, the control circuit 21 includes a source/sensing module 211 and a data programming module 213.

The source/sensing module 211 includes an amplifier Amp1, P-type transistors Msense and Msource, a switching transistor MS1 and a capacitor CS1. An output terminal of the amplifier Amp1 is electrically coupled to the gate of the transistor Msense and further electrically coupled to the gate of the transistor Msource through the switching transistor MS1, an non-inverting input terminal of the amplifier Amp1 is electrically coupled to a constant voltage Vcol, and an inverting input terminal of the amplifier Amp1 is electrically coupled to a node nc. The node nc stays constant at the voltage Vcol except for small variation during programming. When the switching transistor MS1 is turned ON, gate voltages of the respective transistors Msense and Msource are established by a current, which flows through the transistors Msense and Msource in response to the current line 24. When the current line 24 starts drawing more current, the node nc and correspondingly the inverting input terminal of the amplifier Amp1 voltage change. Hence in response to any node nc voltage change, the amplifier Amp1 regulates the gate voltages of the respective transistors Msense and Msource to regulate a current flowing through the transistors Msense and Msource. The resulting change in the voltage at the output terminal of the amplifier Amp1 changes the gate voltages of the respective transistors Msense and Msource until the current supplied by both the transistors matches the drawn current. In addition, the capacitor CS1 is electrically coupled between the gate and the drain of the transistor Msource, so that the gate voltage of the transistor Msource stays constant when the switching transistor MS1 is turned OFF.

The data programming module 213 is electrically coupled to the source/sensing module 211. The data programming module 213 includes an amplifier Amp2, a switching transistor MS2 and a capacitor CS2. An output terminal of the amplifier Amp2 is electrically coupled to the data line 22, an non-inverting input terminal of the amplifier Amp2 is electrically coupled to the capacitor CS2 and further electrically coupled to the gate of the transistor Msense through the switching transistor MS2, and an inverting input terminal of the amplifier Amp2 is electrically coupled to the gate of the transistor Msense. In a sampling period, the switching transistor MS2 is turned ON to sample the voltage at the gate of the transistor Msense and stores it in the capacitor CS2.

Each of the pixels 23 has a circuit configuration of 2T1C (i.e., two-transistor-one-capacitor) and specifically includes an N-type driving transistor M21, a switching transistor M22, an OLED 232 and a storage capacitor Cs. The gate of the driving transistor M21 is electrically coupled to the data line 22 through the switching transistor M22, the source of the driving transistor M21 is electrically coupled to a positive terminal of the OLED 232, and the drain of the driving transistor M21 is electrically coupled to the current line 24. The storage capacitor Cs is electrically coupled between the gate and the source of the driving transistor M21.

During a programming period, a single pixel in one pixel column is selected and the switching transistor M22 of the selected pixel is turned ON. The source/sensing module 211, the data programming module 213 and the driving transistor M21 of the selected pixel 23 constitute a feedback loop through the current line 24 at the node nc and the data line 22. When an external data current Idata is injected into the node nc, using the transistor Msense of the source/sensing module 211 to sense node nc voltage change and providing a particular data voltage (i.e., generally programmed data voltage) by the output terminal of the amplifier Amp2 of the data programming module 213 to drive the gate of the driving transistor M21, until the current drawn by the driving transistor M21 from the current line 24 matches the injected data current Idata. As a result, a pixel current of the selected pixel is compensated (i.e., generally an updated pixel current is written).

However, for the above-mentioned active matrix OLED display, since the current line 24 is used for both current sensing and power supplying, although only one pixel in one pixel column is selected to perform the pixel current compensation during the programming period, the driving transistors of the other non-selected pixels all still have currents flowing therethrough so that the current on the whole current line is extremely large while the current flowing through the selected pixel relatively is considerably small. As a result, it is difficult to distinguish the current for compensating the selected pixel from another current caused by noise and thus the compensation accuracy of pixel current is unsatisfactory.

BRIEF SUMMARY

The present invention relates to an active matrix OLED display to increase the compensation accuracy of pixel current.

The present invention further relates to a pixel circuit adapted for an active matrix OLED display, to increase the compensation accuracy of pixel current.

The present invention still further relates to a data current writing method adapted for being performed in an active matrix OLED display, to increase the compensation accuracy of pixel current.

An active matrix OLED display in accordance with an embodiment of the present invention is provided. The active matrix OLED display includes a data line, a current sensing line, a power line, and a plurality of pixels electrically coupled with the data line, the current sensing line and the power line. During a data current is writing to a selected one of the pixels, the selected pixel draws a current from the current sensing line, the data line supplies a particular data voltage (i.e., generally programmed data voltage) to the selected pixel according to the drawn current from the current sensing line until the drawn current matches the data current; the other non-selected pixels draw currents from the power line for light-emission.

In one embodiment, the selected pixel includes a driving transistor, a first switching transistor, a second switching transistor, a third switching transistor, a storage capacitor and an OLED. The first source/drain of the first switching transistor is electrically coupled to the gate of the driving transistor, and the second source/drain of the first switching transistor is electrically coupled to the data line. The first source/drain of the second switching transistor is electrically coupled to the second source/drain of the driving transistor, and the second source/drain of the second switching transistor is electrically coupled to the power line. The first source/drain of the third switching transistor is electrically coupled to the second source/drain of the driving transistor, and the second source/drain of the third switching transistor is electrically coupled to the current sensing line. A positive terminal of the OLED is electrically coupled to the first source/drain of the driving transistor, and a negative terminal of the OLED is electrically coupled to a predetermined potential (e.g., grounding potential). Moreover, during the data current is writing to the selected pixel, the first switching transistor is turned ON and thereby the particular data voltage stores in the storage capacitor and controls the electrical conduction status of the driving transistor, the second switching transistor is turned OFF, the third switching transistor is turned ON, the OLED draws the current from the current sensing line through the driving transistor and the turned ON third switching transistor. Furthermore, a gate control signal of the second switching transistor is phase-inverted with another gate control signal of the third switching transistor. In addition, the selected pixel can further include a compensation capacitor electrically coupled between the second source/drain of the driving transistor and the negative terminal of the OLED.

A pixel circuit in accordance with another embodiment of the present invention is adapted for an active matrix OLED display including a data line, a current sensing line and a power line. The pixel circuit includes a driving transistor, a first switching transistor, a second switching transistor, a third switching transistor, a storage capacitor and an OLED. The first source/drain of the first switching transistor is electrically coupled to the gate of the driving transistor, and the second source/drain of the first switching transistor is electrically coupled to the data line. The first source/drain of the second switching transistor is electrically coupled to the second source/drain of the driving transistor, and the second source/drain of the second switching transistor is electrically coupled to the power line. The first source/drain of the third switching transistor is electrically coupled to the second source/drain of the driving transistor, and the second source/drain of the third switching transistor is electrically coupled to the current sensing line. The storage capacitor is electrically coupled to the gate of the driving transistor and one of the first source/drain and the second source drain of the driving transistor according to the conductive type of the driving transistor. A positive terminal of the OLED is electrically coupled to the first source/drain of the driving transistor, and A negative terminal of the OLED is electrically coupled to a predetermined potential (e.g., grounding potential). Moreover, during the active matrix OLED display is in operation, on/off states of the second and third switching transistors are determined by the OLED drawing a current from which one of the current sensing line and the power line. Furthermore, a gate control signal of the second switching transistor is phase-inverted with another gate control signal of the third switching transistor. In addition, the pixel circuit can further include a compensation capacitor electrically coupled between the second source/drain of the driving transistor and the negative terminal of the OLED.

A data current writing method in accordance with still another embodiment of the present invention is adapted for being performed in an active matrix OLED display. The active matrix OLED includes a data line, a current sensing line, a power line and a plurality of pixels electrically coupled with the data line, the current sensing line and the power line. The data current writing method includes the following steps: enabling a selected one of the pixels to draw a current from the current sensing line during writing a data current; and directing the selected pixel to draw a current from the power line for light-emission after the data current is written. In addition, the data current writing method can further include the step of: during writing the data current, the other non-selected pixels draw currents from the power line for light-emission.

In the above-mentioned embodiments of the present invention, separate current sensing line and the power line are respectively used for current sensing and power supplying, such arrangement allows a selected pixel to draw a current from the current sensing line while the other non-selected pixels to draw currents from the power line during writing a data current to the selected pixel for compensating the pixel current of the selected pixel, so that a current will be written only flows through the selected pixel and thus the other non-selected pixels would not influence the compensation accuracy of a pixel current for the selected pixel. Accordingly, the above-mentioned embodiments of the present invention can effectively increase the compensation accuracy of pixel current. In addition, by adding a compensation capacitor in the pixel circuit, an influence caused by IR drop can be effectively compensated.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2:
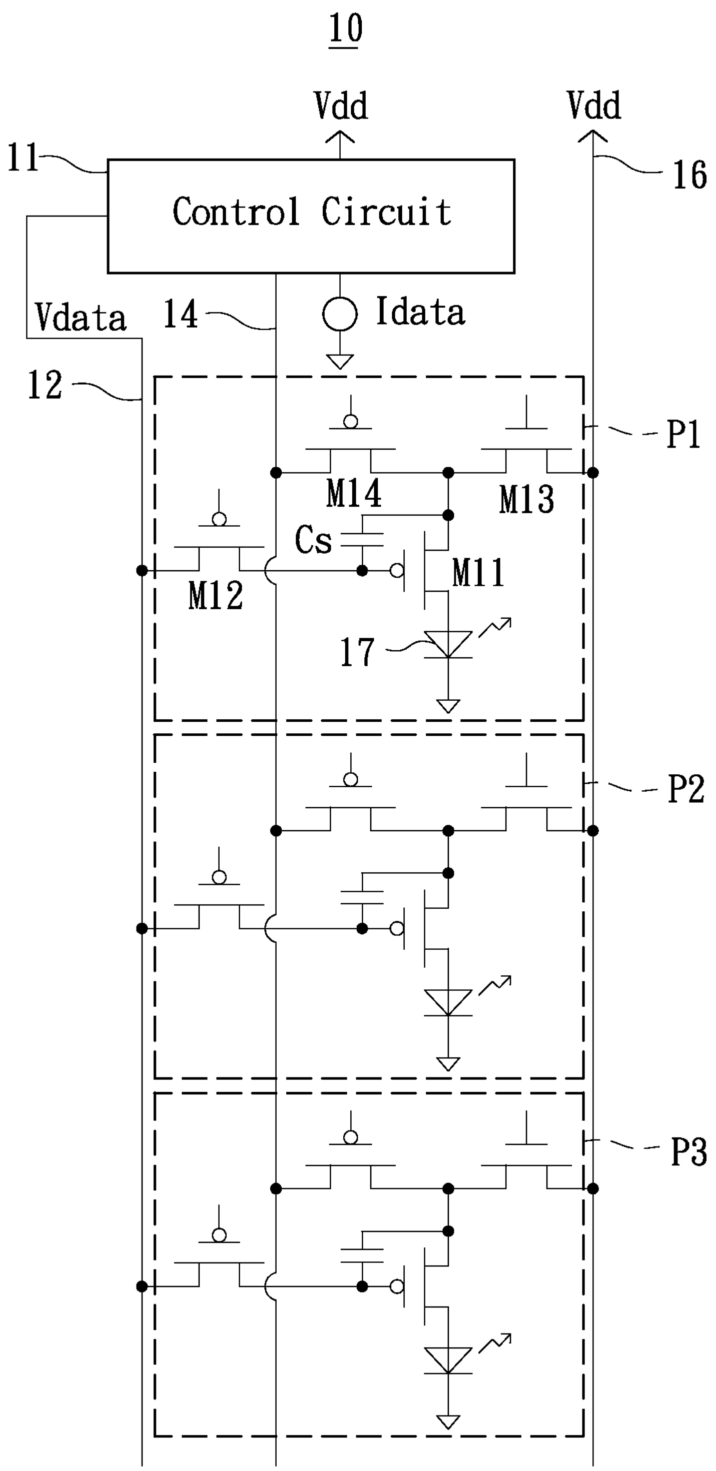
FIG. 2 shows a schematic partial circuit diagram of an active matrix OLED display in accordance with an embodiment of the present invention.

Referring to FIG. 2, a schematic partial circuit diagram of an active matrix organic light emitting diode (OLED) display in accordance with an embodiment of the present invention is shown. FIG. 2 only shows a plurality of pixels in one pixel column for the purpose of illustration, but is not used to limit the present invention. It is understood to the skilled person in the art, an active matrix OLED display generally includes a large amount of pixels arranged in a matrix (e.g., arranged in rows and columns).

Figure 1:
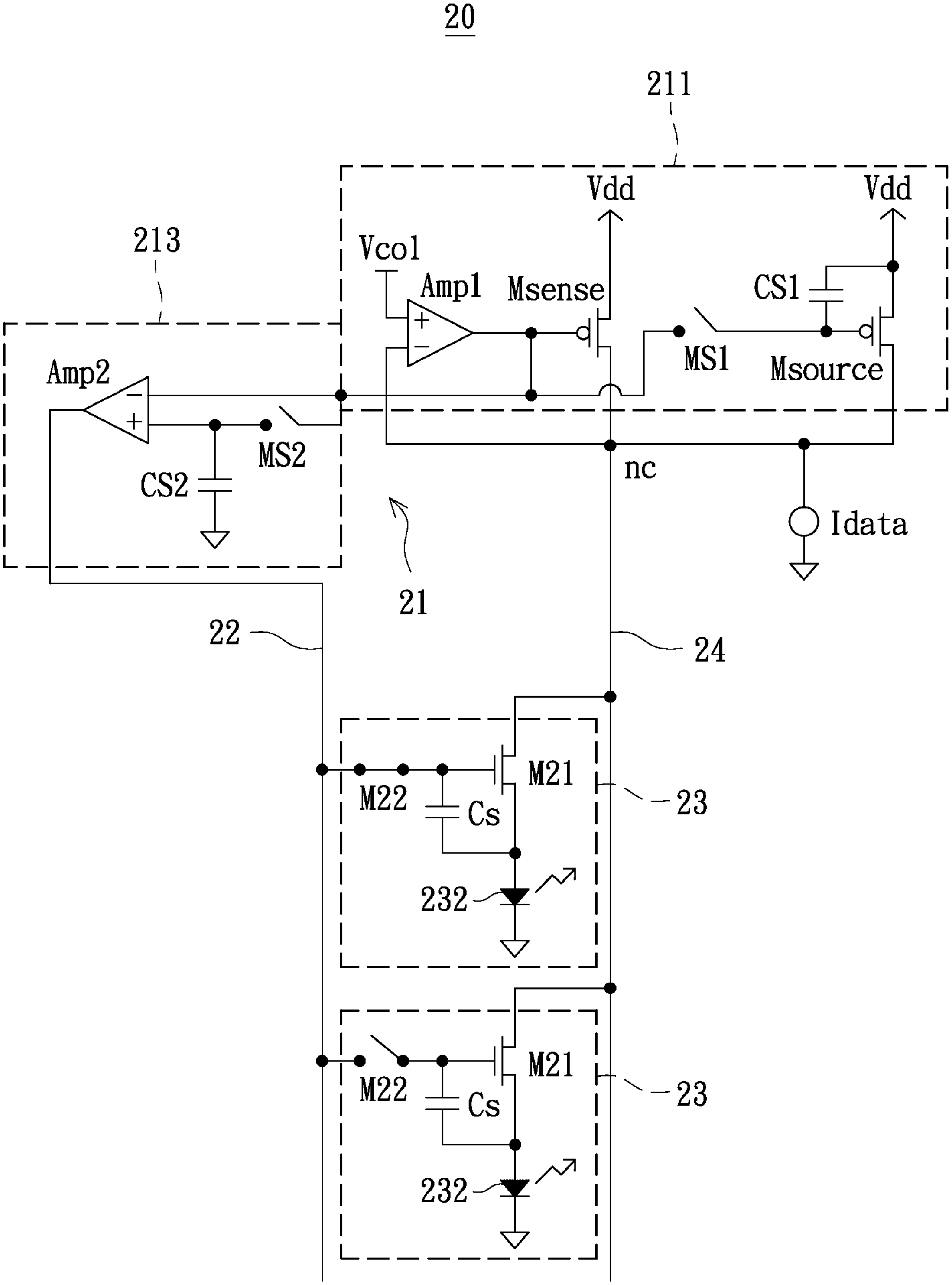
FIG. 1 (Prior Art)
FIG. 1 shows a schematic partial circuit diagram of an active matrix OLED display associated with the prior art.

As illustrated in FIG. 2, the active matrix OLED display 10 includes a control circuit 21, a data line 12, a current sensing line 14, a power line 16 and a plurality of pixels P1, P2, P3. The pixels P1, P2, P3 all are electrically coupled with the data line 12, the current sensing line 14 and the power line 16. The data line 12 and the current sensing line 14 are electrically coupled to the control circuit 11. The detailed circuit of the control circuit 11 can be the same as that of the control circuit 21 illustrated in FIG. 1 and also can include the source/sensing module 211 and the data programming module 213. Correspondingly, electrical connections relationships among the data line 12, the current sensing line 14 and the control circuit 11 can be the same as that among the data line 22, the current line 24 and the control circuit 21. Accordingly, the control circuit 11 can be used for compensating a pixel current of a selected pixel according to its internally sensed voltage change (i.e., the node nc voltage change in FIG. 1).

Each of the pixels P1, P2, P3 has a circuit configuration of 4T1C (i.e., four-transistor-one-capacitor) and specifically includes a driving transistor M11, multiple switching transistors M12, M13, M14, and an OLED 17. In particular, the drain of the switching transistor M12 is electrically coupled to the data line 12, and the source of the switching transistor M12 is electrically coupled to the gate of the driving transistor M11; the drain of the switching transistor M13 is electrically coupled to the power line 16, and the source of the switching transistor M13 is electrically coupled to the drain of the driving transistor M11; the drain of the switching transistor M14 is electrically coupled to the current sensing line 14, and the source of the switching transistor M14 is electrically coupled to the drain of the driving transistor M11; the source of the driving transistor M11 is electrically coupled to a positive terminal of the OLED 17, and a negative terminal of the OLED 17 is electrically coupled to a predetermined potential e.g., grounding potential. The storage capacitor Cs is electrically coupled between the gate of the driving transistor M11 and one of the source and drain of the driving transistor M11 according to the conductive type of the driving transistor M11. For example, the driving transistor M11 as illustrated in FIG. 2 is a P-type transistor, the storage capacitor Cs is electrically coupled between the gate and the drain of the driving transistor M11 correspondingly.

When the active matrix OLED display 10 is in operation, during a data current Idata is writing to a selected pixel (e.g., the pixel P1) for compensating a pixel current of the selected pixel, the selected pixel P1 is enabled to draw a current from the current sensing line 14, the control circuit 11 senses the drawn current from the current sensing line 14 and produces a particular data voltage (i.e., generally programmed data voltage) Vdata according to the variation of the drawn current from the current sensing line 14, the data voltage Vdata is supplied to the selected pixel P1 through the data line 12 until the drawn current from the current sensing line 14 matches the data current Idata, the other non-selected pixels P2, P3 in the pixel column draw currents from the power line 16 for light-emission rather than the current sensing line 14. After the data current Idata is written, the selected pixel P1 is redirected to draw a current from the power line 16 for light-emission.

More specifically, during the data current Idata is writing to the selected pixel P1, in one aspect, the switching transistor M12 of the selected pixel P1 is turned ON and thereby the particular/programmed data voltage Vdata produced by the control circuit 11 and then supplied by the data line 12 stores in the storage capacitor Cs after passing through the switching transistor M12 and controls the electrical conduction status of the driving transistor M11 (i.e., generally the current flowing through the driving transistor M11 is varied along the change of the particular/programmed data voltage Vdata). The switching transistor M13 of the selected pixel P1 is turned OFF and the switching transistor M14 is turned ON, the OLED 17 of the selected pixel P1 draws the current from the current sensing line 14 through the driving transistor M11 and the turned ON switching transistor M14; in another aspect, for each of the non-selected pixels P2, P3, the switching transistors M12, M14 are turned OFF and the switching transistor M13 is turned ON, so that the OLED 17 draws a current from the power line 16 through the driving transistor M11 and the turned ON switching transistor M13 for light-emission.

From the foregoing description, it is found that on/off states of the switching transistors M13 and M14 are determined by the OLED 17 drawing the current from which one of the current sensing line 14 and the power line 16, gate control signals of the switching transistors M13 and M14 are phase-inverted with each other. In addition, the on/off states of the switching transistor M12 can be controlled by a row scanning line (not shown).

Moreover, since the OLED 17 is a current-driving element, when the power line 16 is supplying power, the power line 16 would have a current flowing therethrough, the whole power line 16 inherently has the existence of parasitic resistance effect, internal resistance (IR) would cause a drop of the power voltage Vdd, which would result in a difference existed between the gate-source voltage (Vgs) of the driving transistor M11 and the expected value thereof. The IR drop is more serious in a large-sized display panel.

Figure 3:
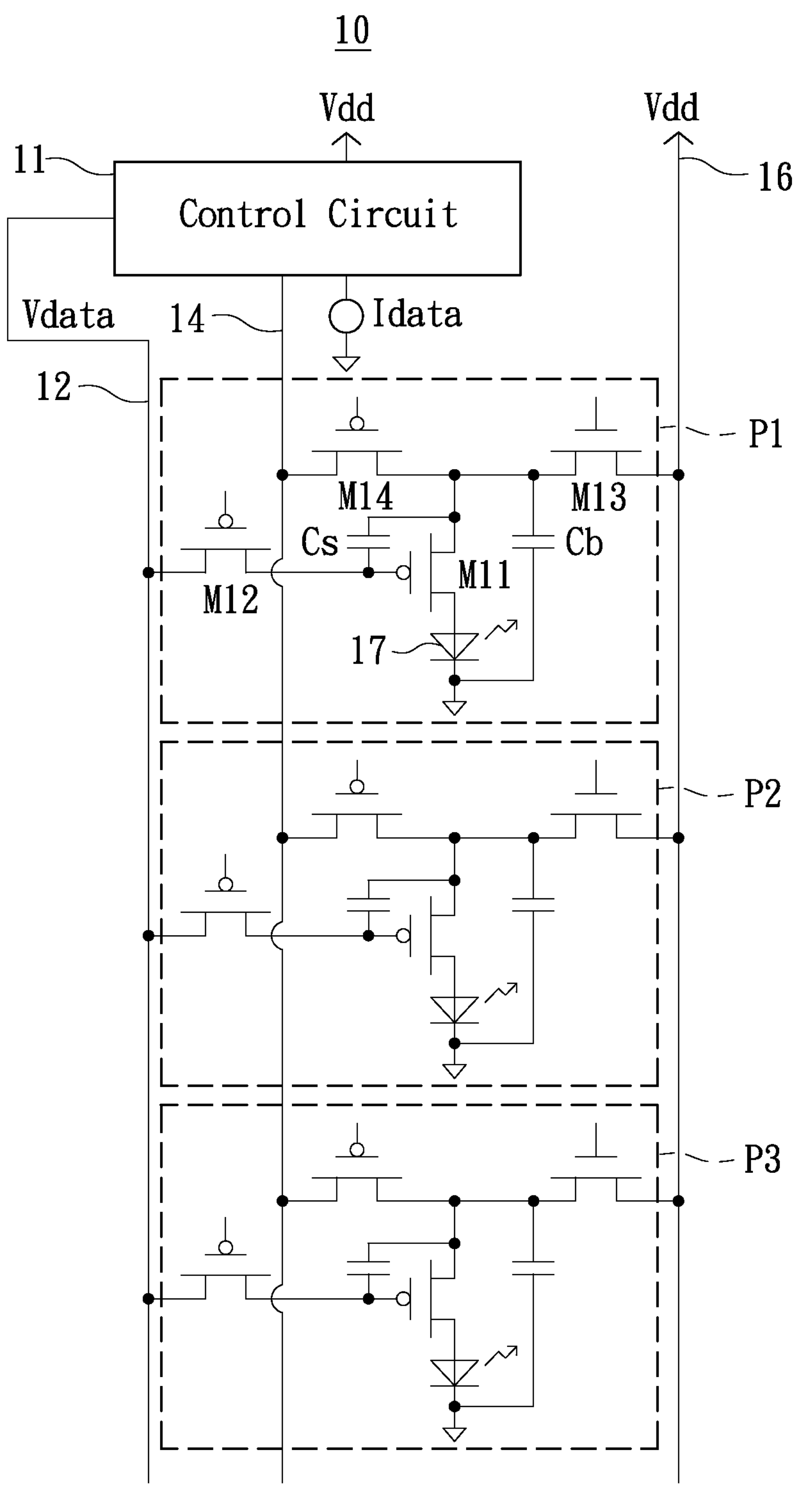
FIG. 3 shows a schematic partial circuit diagram of an active matrix OLED display in accordance with another embodiment of the present invention.

In order to effectively compensate the influence caused by IR drop, referring to FIG. 3, each of the pixels P1, P2, P3 of the active matrix OLED display 10 in another embodiment can further include a compensation capacitor Cb. The compensation capacitor Cb is electrically coupled between the drain of the driving transistor M11 and the negative terminal of the OLED 17. Herein, each of the pixels P1, P2, P3 is modified to be a 4T2C circuit configuration from the above-mentioned 4T1C circuit configuration. By adding the compensation capacitor Cb to memorize the voltage difference existed on the power line 16 and caused by IR drop, during the data current Idata is writing, the purpose of compensating IR drop can be achieved by way of programming the data voltage Vdata according to internal sensed voltage change and internal compensation effect of the control circuit 11.

In summary, in the above-mentioned embodiments of the present invention, separate current sensing line and the power line are respectively used for current sensing and power supplying, such arrangement allows a selected pixel to draw a current from the current sensing line while the other non-selected pixels to draw currents from the power line during writing a data current to the selected pixel for compensating the pixel current of the selected pixel, so that a current will be written only flows through the selected pixel and thus the other non-selected pixels would not influence the compensation accuracy of a pixel current for the selected pixel. Accordingly, the above-mentioned embodiments of the present invention can effectively increase the compensation accuracy of pixel current. In addition, by adding a compensation capacitor in the pixel circuit, an influence caused by IR drop can be effectively compensated.

Additionally, the skilled person in the art can make some modifications with respect to the active matrix OLED displays in accordance with the above-mentioned embodiments, for example, changing the circuit configuration of the control circuit, the circuit configurations of the respective pixels, the conductive types (i.e., P-type or N-type) of the respective transistors, interchanging the electrical connections of the sources and the drains of the respective transistors, and so on, as long as such modification(s) would not depart from the scope and spirit of the present invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An active matrix organic light emitting diode display comprising:

a data line;

a current sensing line;

a power line; and a plurality of pixels directly coupled to the same data line, the same current sensing line and the same power line;

wherein during a data current is writing to a selected one of the pixels, the selected pixel only draws a current from the current sensing line, the data line supplies a particular data voltage to the selected pixel according to the drawn current from the current sensing line until the drawn current from the current sensing line matches the data current, and the other non-selected pixels only draw currents from the power line for light-emission;

wherein the selected pixel comprises:

a driving transistor;

a first switching transistor, the first source/drain of the first switching transistor being directly connected to the gate of the driving transistor, and the second source/drain of the first switching transistor being directly connected to the data line;

a second switching transistor, the first source/drain of the second switching transistor being directly connected to the second source/drain of the driving transistor, and the second source/drain of the second switching transistor being directly connected to the power line;

a third switching transistor, the first source/drain of the third switching transistor being directly connected to the second source/drain of the driving transistor, and the second source/drain of the third switching transistor being directly connected to the current sensing line;

a storage capacitor; and an organic light emitting diode, a positive terminal of the organic light emitting diode being directly connected to the first source/drain of the driving transistor, and a negative terminal of the organic light emitting diode being directly connected to a predetermined potential;

a compensation capacitor, the compensation capacitor having a first terminal and a second terminal, and the first terminal thereof being directly connected to the second source-drain of the driving transistor and the second terminal thereof being directly connected to the negative terminal of the organic light emitting diode wherein during the data current is writing to the selected pixel, the first switching transistor is turned ON and thereby the particular data voltage stores in the storage capacitor and controls the conduction status of the driving transistor, the second switching transistor is turned OFF, the third switching transistor is turned ON, and the organic light emitting diode draws the current from the current sensing line through the driving transistor and the third switching transistor.

2. The active matrix organic light emitting diode display as claimed in claim 1, wherein a gate control signal of the second switching transistor is phase-inverted with another gate control signal of the third switching transistor.

3. The active matrix organic light emitting diode display as claimed in claim 1, wherein the driving transistor is a P-type transistor, the first switching transistor is a P-type transistor, the second switching transistor is an N-type transistor, and the third switching transistor is a P-type transistor.

4. A pixel circuit adapted for an active matrix organic light emitting diode display including a data line, a current sensing line and a power line, the pixel circuit comprising:

a driving transistor;

a first switching transistor, the first source/drain of the first switching transistor being directly connected to the gate of the driving transistor, and the second source/drain of the first switching transistor being directly connected to the data line;

a second switching transistor, the first source/drain of the second switching transistor being directly connected to the second source/drain of the driving transistor, and the second source/drain of the second switching transistor being directly connected to the power line;

a third switching transistor, the first source/drain of the third switching transistor being directly connected to the second source/drain of the driving transistor, and the second source/drain of the third switching transistor being directly connected to the current sensing line;

a storage capacitor directly connected between the gate of the driving transistor and one of the first source/drain and the second source/drain of the driving transistor according to the conductive type of the driving transistor; and an organic light emitting diode, a positive terminal of the organic light emitting diode being directly connected to the first source/drain of the driving transistor, and a negative terminal of the organic light emitting diode being directly connected to a predetermined potential;

a compensation capacitor, the compensation capacitor having a first terminal and a second terminal, and the first terminal thereof being directly connected to the second source/drain of the driving transistor and the second terminal thereof being directly connected to the negative terminal of the organic light emitting diode;

wherein during the active matrix organic light emitting diode display is in operation, on/off states of the second and third switching transistors are determined by the organic light emitting diode drawing a current from which one of the current sensing line and the power line.

5. The pixel circuit as claimed in claim 4, wherein a gate control signal of the second switching transistor is phase-inverted with another gate control signal of the third switching transistor.

6. The pixel circuit as claimed in claim 4, wherein the driving transistor is a P-type transistor, the first switching transistor is a P-type transistor, the second switching transistor is an N-type transistor, and the third switching transistor is a P-type transistor.

7. A data current writing method adapted for being performed in an active matrix organic light emitting diode display, the active matrix organic light emitting diode display including a plurality of scan lines, a plurality of data lines, and a plurality of pixels, each of the pixels being directly connected to a corresponding scan line and a corresponding data line, a plurality of pixels in a column being directly connected to the plurality of scan lines respectively, and the plurality of the pixels in the column being electrically connected to a same data line, a same current sensing line and a same power line; the data current writing method comprising:

enabling a selected one of the pixels to draw a current from the current sensing line only during writing a data current; and directing the selected pixel to draw a current from the power line only after the data current is written line;

wherein the selected pixel comprises a driving transistor, a first switching transistor, a second switching transistor, a third switching transistor, a storage capacitor and an organic light emitting diode and a compensation capacitor, the data current writing method comprises: directly connecting the gate of the driving transistor to the first source/drain of the first switching transistor, directly connecting the first source/drain of the driving transistor to a positive terminal of the organic light emitting diode, and directly connecting the second source/drain of the driving transistor to the first sources/drains of the second and third switching transistors;

directly connecting the second sources/drains of the first through the third switching transistors respectively to the data line, the power line and the current sensing line;

directly connecting a negative terminal of the organic light emitting diode to a predetermined potential;

directly connecting the storage capacitor between the gate of the driving transistor and one of the first source/drain and the second source/drain of the driving transistor according to the conductive type of the driving transistor; and directly connecting the compensation capacitor between the second source/drain of the driving transistor and the negative terminal of the organic light emitting diode; and the step of enabling the selected pixel to draw the current from the current sensing line during writing the data current comprising: turning ON the first and third switching transistors and turning OFF the second switching transistor, and the data line supplying a particular data voltage to the selected pixel according to the drawn current from the current sensing line until the drawn current from the current sensing line matches the data current.

8. The data current writing method as claimed in claim 7, further comprising: during writing the data current, the other non-selected pixels in the column draw currents from the power line for light-emission.

9. The data current writing method as claimed in claim 7, wherein the driving transistor is a P-type transistor, the first switching transistor is a P-type transistor, the second switching transistor is an N-type transistor, and the third switching transistor is a P-type transistor.

* * * * *